United States Patent [19]
Rutledge et al.

[11] Patent Number: 4,501,543
[45] Date of Patent: Feb. 26, 1985

[54] ROTARY EXTRUDER
[75] Inventors: Raleigh N. Rutledge; Granville J. Hahn, both of Big Spring, Tex.
[73] Assignee: Cosden Technology, Inc., Dallas, Tex.
[21] Appl. No.: 457,614
[22] Filed: Jan. 13, 1983
[51] Int. Cl.³ .............................................. B29F 3/012
[52] U.S. Cl. ................................. 425/191; 264/169; 264/176 C; 264/310; 264/311; 366/69; 366/89; 366/99; 425/192 R; 425/376 B; 425/381.2
[58] Field of Search ............... 425/191, 192 R, 376 B, 425/377, 381.2, 224; 264/176 C, 169, 310, 311; 366/69, 98, 99

[56] References Cited
U.S. PATENT DOCUMENTS

| 281,711 | 7/1883 | Merrill | 425/376 B |
|---|---|---|---|
| 3,079,635 | 3/1963 | Adams | 264/176 C |
| 3,137,895 | 6/1964 | Kusch | 425/376 B |
| 3,277,528 | 10/1966 | Nikiforov | 425/381.2 |
| 3,343,212 | 9/1967 | Adams | 425/381.2 |
| 3,475,788 | 11/1969 | Heston | 425/377 |
| 3,504,401 | 4/1970 | Cerny | 425/191 |
| 3,829,270 | 8/1974 | DeBonth et al. | 425/381.2 |
| 3,880,564 | 4/1975 | Beck et al. | 425/376 R |
| 4,012,477 | 3/1977 | Beck et al. | 264/176 R |
| 4,300,842 | 11/1981 | Hold et al. | 425/381.2 |

FOREIGN PATENT DOCUMENTS 0765106  9/1971  Belgium .................. 425/376 B

OTHER PUBLICATIONS
*Plastics World*, May, 1979, p. 54.

Primary Examiner—Jeffery Thurlow
Assistant Examiner—Patrick Dailey
Attorney, Agent, or Firm—Robert H. Sproule; Roy L. Van Winkle

[57] ABSTRACT

A rotary extruder contains pump rings positioned at opposite ends of the rotor shaft to collect excess thermoplastic melt forced outwardly to the housing ends and to redirect this excess melt to the feed section of the extruder. Redirection of the melt is accomplished by helical grooves located on the inside surfaces of the pump rings having an axial component directed toward the center of the extruder to provide a conduit for the melt. The melt is also directed by a series of angular grooves positioned circumferentially about the rotor opposite the pump rings which rotationally and axially propel the melt as the extruder rotor rotates. The rotor shaft is supported by bearings at opposite ends of the shaft which are offset from the axial center of the bearing housing. Repositioning of the bearing housings by rotation about their axes change the axial position of the rotor relative to the inner surface of the extruder housing thereby varying the size of the feed and compression sections of the rotary extruder to accommodate different types of thermoplastic material. A feed hopper for holding thermoplastic feed has its outlet positioned above a variable speed endless belt which discharges into the inlet of a rotary extruder, the rate of delivery to the extruder being independent upon the rotational speed of the belt. A rotary gear pump is positioned between the extruder die and the extruder housing to increase the discharge pressure into the die.

12 Claims, 9 Drawing Figures

ROTARY EXTRUDER

BACKGROUND OF THE INVENTION

This invention relates to apparatus for melting thermoplastic material and for delivering the melt under pressure to a forming operation.

Historically, solid thermoplastic material, usually in the form of pellets, has been transformed into a molten or otherwise flowable and homogeneous state for further reforming into sheets or film by use of a machine known as a screw extruder. A screw extruder will generally include a hollow barrel or tube having a screwlike member revolving inside the barrel or tube. Pellets and other solid matter are fed into one end of the barrel and are then carried spirally along the barrel by rotation of the screw member in the barrel. As the screw member rotates the pellets and additives are carried along inside the barrel and subjected to increasing pressure due to an increased tapering of the screw base and decreasing clearance between the screw base and the inside wall of the barrel. Due to the increasing pressure and the heat produced by the mechanical work of the screw, the pellets are reduced to a molten or semi-molten form and intermingled with any additives added with the solid pellets. After the pellets are reduced to a molten or semi-molten form, they are expelled out of a suitable aperture or diehead in the opposite end of the barrel. At the diehead the thermoplastic melt is discharged from the extruder and reformed and processed into finished film or sheet stock. This finished film or sheet stock is formed at the discharge end of the die by one or more pairs of opposing rollers which receive the extrudate and compress the extrudate between the rollers to impart the sheet-like configuration sought to be achieved.

Another method of achieving sheet material from the extruder is through the use of a sheet die at the discharge end of the extruder. A sheet die comprises a broad slot-like aperture through which the thermoplastic melt discharging from the extruder is forced. A problem arises, however, in that a certain portion of the extrudate issuing from the extruder must travel in a radial direction to the end of the slot die while melt issuing from the center portion of the die aperture will immediately be pushed through. The resulting travel differences create temperature differentials and stress differentials on the plastic material, degrading the quality of sheet material produced thereby.

A more detailed history of the problems associated with the screw extruder and a solution to some of these problems was disclosed in U.S. Pat. No. 3,880,564 by Beck, et al, incorporated herein by reference, wherein a roller was rotably mounted within a recessed area of a housing forming a substantially cylindrical space. The inner recess of the housing was eccentrically shaped such that by positioning the roller inside the recess a number of arc-like gaps, sometimes referred to as accumulator gaps, were created between the roller and the inner wall of the recess area. The plastic pellets were therefore deposited directly on the roller and thereafter effectively liquified as they were conducted through the first arc-like gap, sometimes referred to as the feed section, and about the roller approximately 180° to the second arc-like gap, sometimes referred to as the compression section, which terminated at the die port. The thermoplastic melt was fed uniformly into the diehead along the length of the roller resulting in a sheet stock having a minimum of internal stresses. The uniform feed resulted because the roller was subject to equal and opposite pressures at the opposite gap locations and thus the roller revolved with little deformation along its length. These opposite pressures were created when quantities of plastic material collected in the opposite gaps creating equal but opposite balancing forces.

In spite of the novelty of concept of the rotary extruder, numerous problems have resulted in its operation. Due to the large internal pressures generated inside the rotary extruder by extrusion through certain types of dies, a significant leakage of thermoplastic melt resulted along the rotor shaft around the housing end plates. The installation of end seals although reducing some of the leakage, was not sufficient to overcome the leakage due to the high pressures generated within the apparatus. Due to the inability of the end seals to control the leakage, the loss of thermoplastic melt has been accepted as a operating cost of doing business. A rotor utilizing a herringbone grooved pattern at opposite ends of the rotor to help retain the melt inside the rotor housing was disclosed in the May 1979 issue of *Plastics World* magazine. The herringbone grooves were unsuccessful in retaining the thermoplastic material inside the housing however because they failed to re-deposit the thermoplastic material into the low pressure area of the extruder. Additional problems have arisen in the feeding of the solid thermoplastic material into the extruder. Historically, a flood feeding method was used, whereby the extruder was gravity fed from a filled hopper and as the rotor displaced the feed inside the feed section of the housing, it was immediately replaced from the hopper by an equivalent quantity of feed. The flood feeding method, although relatively successful in a screw-type extruder, has caused heat penetration of feed stocks prior to being drawn into the extruder, uneven feedage, and even blockage of the rotary extruder due to partial melting of the feed causing it to stick in the feed chute.

Further problems have resulted in attempting to adjust the accumulator gaps to accomodate the various types of feeds encountered. As is known in the art, different types of feeds, for example polystyrene or ABS, require different amounts of clearance between the body of the screw and the inside surface of the housing in both the feed and compression sections respectively in order to accomodate different polymers having different melt characteristics. In some rotary extruders, the size and shape of these arc-like gaps between the rotor and the housing are changed by repositioning the housing relative to the rotor. Because the housing is often made up of two or more sections, adjusting these gaps by changing the position of the housing has been unsuccessful because the housing sections are subsequently forced out of position due to the high internal pressures generated in the extruder. In addition, adjusting the individual housing sections was complicated, time consuming, and imprecise.

In addition, when using certain high pressure dies, such as a strand die, the discharge pressure from the rotary extruder was not sufficiently high to extrude through the die thereby severely limiting the usefulness of the rotary extruder.

Additional problems have been caused by the transfer of heat from the rotary extruder to the thermoplastic feed held in the feed chute. It has been found that this preheating of the thermoplastic feed results in its partial melting and agglomeration thereby blocking the feed opening to the extruder preventing a smooth delivery of feed to the rotor.

The present invention, however, has overcome the deficiencies associated with other rotary extruders to provide an apparatus which produces high quality stock without the inefficiencies and limitations of other apparatuses.

SUMMARY OF THE INVENTION

In order to overcome the leakage of thermoplastic material from within there is therefore provided an apparatus for plasticizing thermoplastic material including housing having an inner recess, and an inlet and die aperture communicating with the recess. The invention also includes an extrusion member rotably mounted in the housing recess. The extrusion member comprises a cylindrical rotor eccentrically disposed within the recess to define a first clearance zone, sometimes referred to as a feed section, and an opposing smaller second clearance zone, sometimes called a compression section; both clearance zones extending along the length of the rotor between the inner surface of the housing and the outer surface of the rotor. The rotor also includes a plurality of directing grooves on its inside surface at each end. The directing grooves are angularly positioned with respect to the direction of rotation of the rotor to propel the thermoplastic material both circumferentially about the inner surface of the housing and axially towards the center of the housing along the channelling grooves. A ring member is positioned within the recess at opposite ends of the housing. The ring member includes a plurality of helical grooves on its inside surface opposite the directing grooves to spirally channel thermoplastic material away from the ends of the housing; these channelling grooves encircle the housing and are directed axially towards the inside of the housing. Also disclosed is means for axially rotating the roller to plasticize the thermoplastic material within the clearance zones and to deliver the plasticized material from the clearance zones through the die aperture. The directing grooves rotate with the rotor to propel the thermoplastic material towards the center of the housing along the channelling grooves.

In order to adjust the accumulation gaps to accommodate various types of feed there is provided means for supporting the roller within the recess. The support means is adapted to be repositioned within the recess to change the rotational axis of the roller relative to the inner surface of the recess. By adjusting the position of the roller relative to the housing, the problems of adjusting individual housing sections is overcome.

The problems involved with the feeding of the thermoplastic material into the extruder have been overcome by providing means for selectively varying the quantity of feed delivered to the inlet to the housing. The delivery means includes a variable speed endless belt; the rate at which thermoplastic material is delivered to the housing is dependent upon the rotational velocity of the endless belt.

Means for increasing the discharge pressure from the rotary extruder has been devised for use with high pressure dies. This pressure increasing means, such as a rotary gear pump, is positioned between and in communication with the die aperture and the housing to increase the pressure of the thermoplastic melt through the die aperture.

DETAILED DESCRIPTION OF THE PREFERRED EMBODIMENTS

Figure 1:
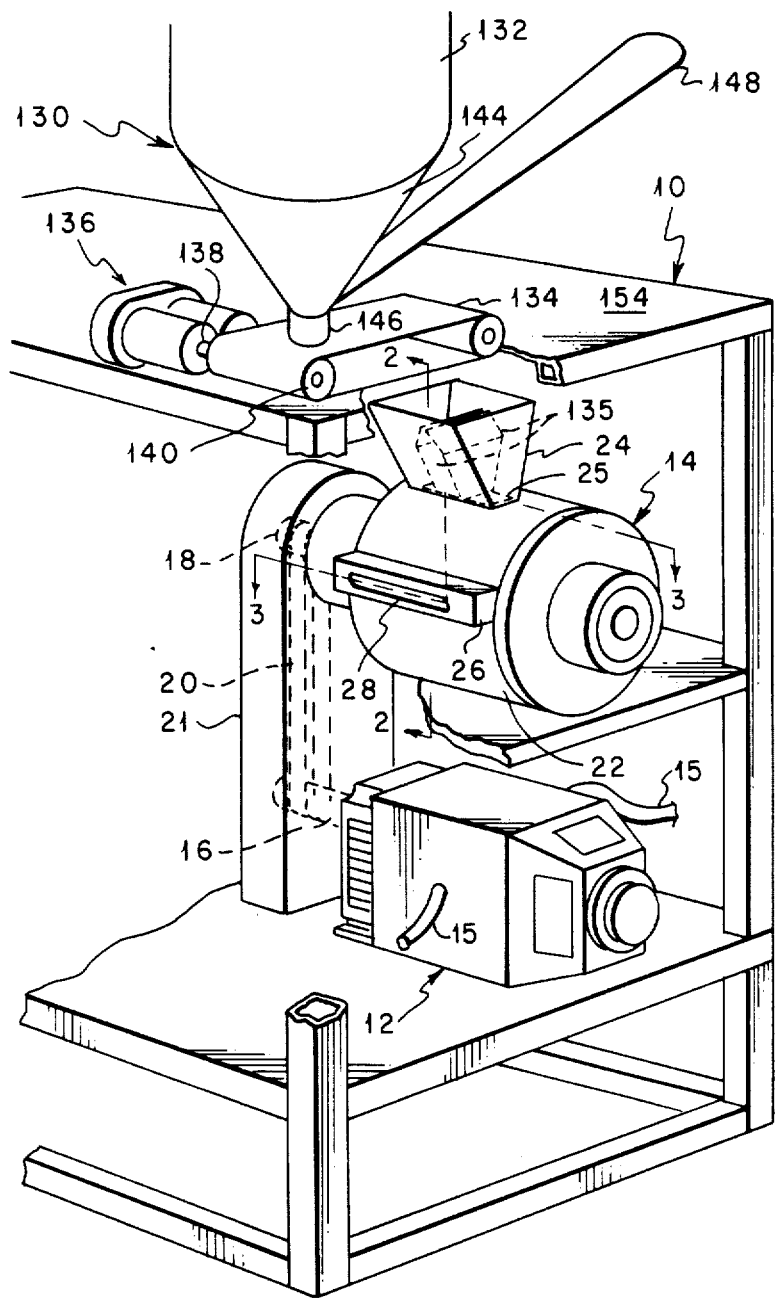
FIG. 1 is a perspective view illustrating the feed assembly, rotary extruder and supporting structure.

Referring now to FIG. 1, there is shown an apparatus designed to produce thermoplastic sheet by means of a supporting structure or frame 10, having mounted thereon an electrical drive motor 12, and a rotary extruder 14. Drive motor 12 and rotary extruder 14 include drive shaft 16 and rotary shaft 18 respectively extending therefrom, and a drive belt 20 connecting shafts 16 and 18 to transmit rotary motion from drive motor 12 to rotary extruder 14. Cover 21 encloses shafts 16 and 18 and drive belt or chain 20 to provide added protection to the operator and personnel. Drive motor 12 may be a variable speed hydraulic motor such as the K-2500-V manufactured by North American Hydraulics, Inc. receiving and delivering pressurized fluid through hydraulic lines 15 from an electric motor and pump (not shown in drawing). Rotary extruder 14 includes a housing 22 affixed to supporting structure or frame 10 and having a feed chute 24 fixed atop housing 22 for delivery of the thermoplastic material to rotary extruder 14 through feed inlet opening 25. A diehead 26 located at the discharge end of extruder 14, has a slot-shaped opening 28 through which the melted thermoplastic material is extruded in order to provide the desired shape material. Also desirable but not shown in the drawings, is a water vat for cooling the thermoplastic material and a series of opposing rollers for pulling the material through the water vat and into storage.

Thermoplastic material suitable for use by the present invention include all extrudable plastic materials such as cellulose esters and ethers such as ethyl cellulose acetate, acetobutyrate, and acetopropionate; vinyl and vinylidene polymers and copolymers such as polymers and copolymers of vinyl chloride, vinyl acetate, vinylidene chloride, polyvinyl alcohol, polyvinyl butyral; and polymers and copolymers of acrylic and methacrylic esters; polymers and copolymers of olefins, such as ethylene, propylene, and butylene; polymers and copolymers of styrene, 2-methyl styrene and their mixtures of elastomeric copolymers; polyamides, interpolyamides such as polyhexamethylene adipamide, polyundecanamide, polyhexamethylenesebacamide; polycarbonates; polyaldehydes, polyethers; polyurethanes; polyesters; natural and synthetic elastomers; thermoplastic fluorinated resins; silicon resins and elastomers, nylons, and polyethylene terephthalate. Preferably, however, polypropylene, polyethylene terephthalate, or the polystyrenes and their copolymers and elastomers, such as polystyrene, styrene-acrylonitrile copolymers (SAN), styrene-butadiene-acrylonitrile-copolymers (ABS), and methacrylate-styrene rubber copolymers are employed. Most preferred, however, is polyethylene terephthalate. These plastic materials can, of course, be used in admixture with fillers, plasticizers, colorants, or other ordinary additives, provided they are in a state permitting melt extrusion.

Figure 2:
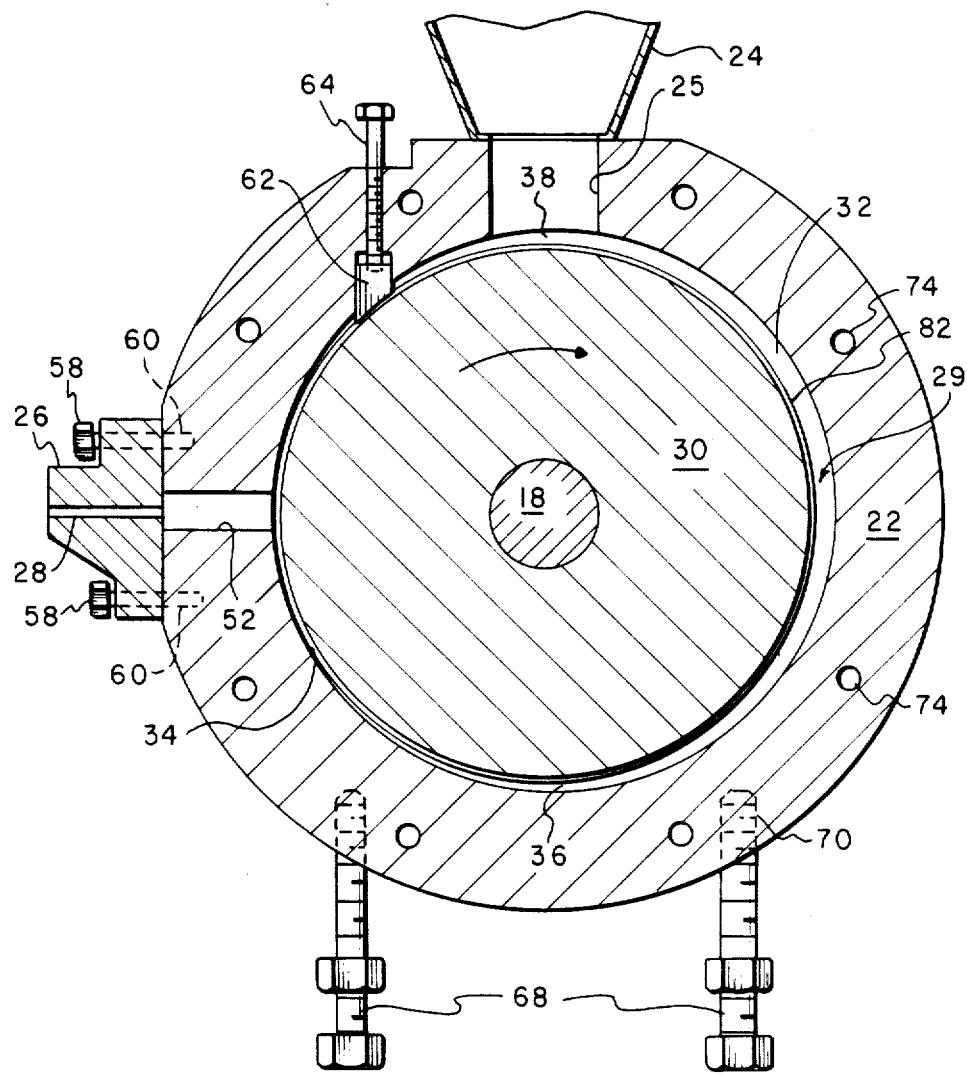
FIG. 2 is a cross-sectional axial view of the apparatus.

Rotary extruder 14 is shown in greater detail by FIG. 2, showing housing 22 having an interior bore 29 for placement of a drum or rotor 30 supported by rotary shaft 18 for clockwise rotational motion within housing 22. Although interior bore 29 may be cylindrically shaped, an elliptically shaped interior bore 29 is preferred for reasons to be discussed later. Rotor 30 longitudinally extends the length of housing 22 and is concentric axially mounted on shaft 18 such that shaft 18 and rotor 30 rotate in unison. Rotor 30 is eccentric positioned within housing 22 in order to create two arc-like gaps having different clearances defined by the distance between the inside surface of housing 22 and the outside surface of rotor 30. Beginning clockwise from the feed inlet opening 25 is the first arc-like gap of approximate uniform clearance, hereinafter referred to as the feed section 32, terminating at approximately the 4 o'clock position. Beginning at approximately the 7 o'clock position and continuing clockwise to the discharge opening 52 located at approximately the 9 o'clock position, is a second narrower arc-like gap of approximate uniform clearance, hereinafter referred to as the compression section 34. Between the feed section 32 and the compression section 34 is transitional section 36 having a tapered clearance to provide a smooth transition between the feed and compression sections. The feed section 32 and compression section 34 each define approximately 25% of the 360° rotation of rotor 30. As mentioned previously, the differences in clearance between the feed and compression sections are desirable to accomodate different types of polymer which have different melting characteristics. Often the relationship between clearances is expressed as the ratio of the feed clearance to the compression clearance. For example, when extruding ABS a ratio of 4:1 has been found to work best; for styrene a ratio of 2.5:1 works well. Therefore in a rotary extruder having a housing inner diameter of 12 inches and a housing length of 12 inches, sometimes referred to as a "12 by 12" rotary extruder, it has been found that when extruding polystyrene, a feed section clearance of 0.250 inch and a compression clearance of 0.100 inch works well, giving feed section to compression section ratio of 2.5 to 1. It should be appreciated that an elliptically shaped interior area 29 helps further define the arc-like shape of feed section 32 and compression section 34 while reducing the arc-length of the transition section 36.

Extending through housing 22 at approximately the 12 o'clock position, is feed opening 25 in communication with interior bore 29 for the purpose of directing thermoplastic material delivered from chute 24 directly onto rotor 30 positioned therebelow. Feed opening 25 longitudinally transverses housing 22 between pump rings 82, 84 (to be discussed later) to insure that thermoplastic material delivered from chute 24 is delivered along the majority of the length of rotor 30. The diehead 26 positioned at approximately the 9 o'clock position, is secured to housing 22 by bolts 58 inserted through threaded slots 60 of housing 22. Diehead 26 includes a die slot 56 in communication with discharge outlet 52 which is sufficiently narrow to provide a film or sheet-like extrudate therethrough. Other types of dies, such as strand dies, foam dies, tubular dies, and profile dies, may be used in place of the sheet die without detracting from the present invention. Mounting bolts 68 connect housing 22 to frame 10 through mounting threaded slots 70 on the underside of housing 22. Positioned inside housing 22 between the discharge opening 52 and feed inlet opening 25 and located above the surface of rotor 30 is choker bar 62. Choker bar 62 is designed to be adjusted vertically toward or away from the surface of drum 30 by rotation of adjustment screw 64 vertically threaded through housing 22. It should be appreciated that discharge outlet 52 and diehead 26 may be located in close proximity to choker bar 62 at the approximate 11 o'clock position without detracting from the invention. By so doing, the thermoplastic melt is subjected to an additional 70° of arc travel to provide additional heating time.

In order for the rotary extruder of the present invention to operate properly, the following equation must be applied in its design and operation:

$$\text{Output (lbs/hours)} = NPHD^2k$$

where $N$ = the specific gravity of the polymer used, $P$ = the pump depth, which is the distance between the outer surface of the rotor and the inner surface of the housing, $H$ = the revolutions per minute of the rotor, $D$ = the diameter of the housing, and $k$ = the viscosity constant for a given polymer, for example the viscosity constant of high impact polystyrene is 2.3. It should be appreciated from the above equation that the basic principles governing the screw extruder must also be applied to the rotary extruder for it to operate properly. The maximum output is limited by the rotational velocity of the rotor which in turn is limited by the ability of the bearings to support the rotor 22 as it turns at a high velocity. Generally, however, it has been found that a rotor velocity between 50 to 100 rpm works satisfactorily.

Figure 3:
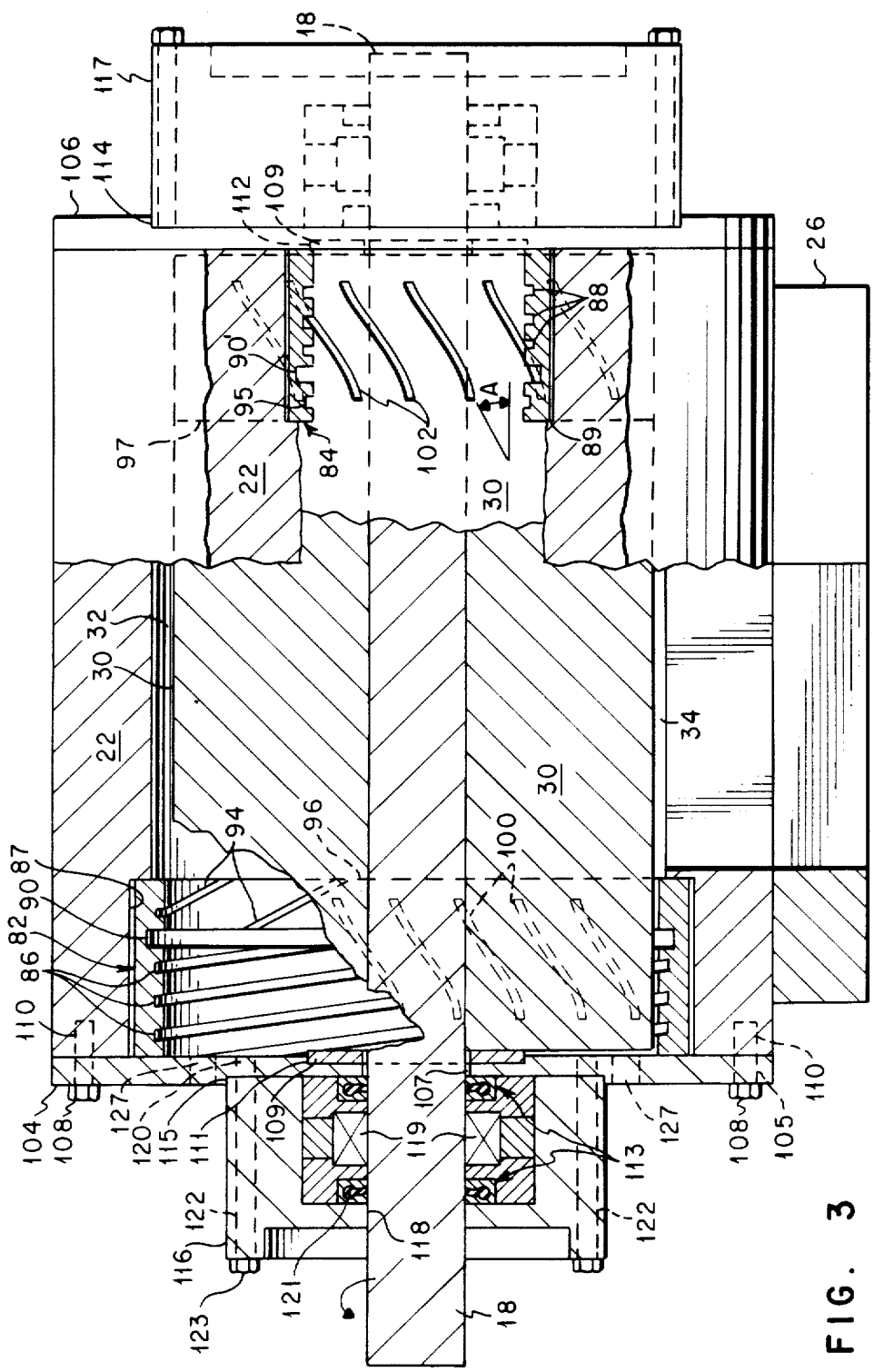
FIG. 3 is a top cross-sectional view of the apparatus.

In order to further describe rotary extruder 14 and its internal structure, refer now to FIG. 3 illustrating a top cross-sectional view of the rotary extruder. Affixed at opposite ends of housing 22 within housing interior section 29 are port and starboard pump rings, generally illustrated as 82 and 84 respectively, sized to fit within port and starboard counterbore receptacles 87, 89 milled into the inside surface of housing 22 at opposite ends thereof; the outside diameter of pump rings 82, 84 being sized approximately ⅛" less than the diameter of counterbore receptacles 87, 89 to allow some radial clearance of the pump rings when the axial position of shaft 18 and rotor 30 are changed. Pump rings 82, 84 are held in place in counterbore receptacles 87, 89 by end plates 104, 106 in a manner to be described later.

Figure 4:
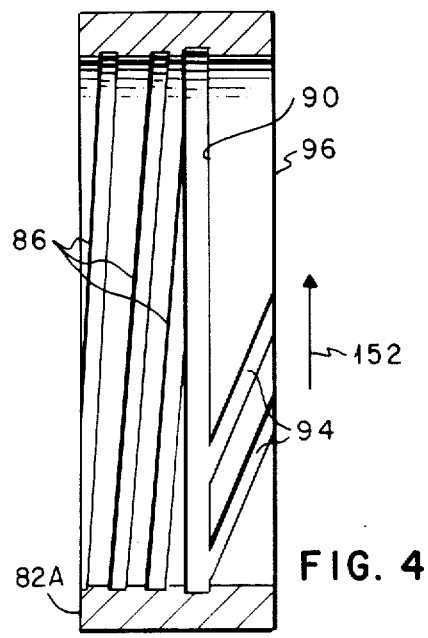
FIGS. 4 and 5 are a cross-sectional views of the port pump ring illustrating the channelling grooves, central collecting groove, and outlet grooves.
Figure 5:
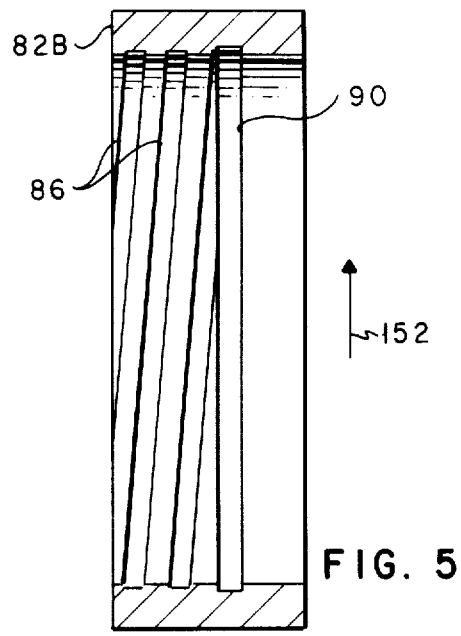
Figure 6:
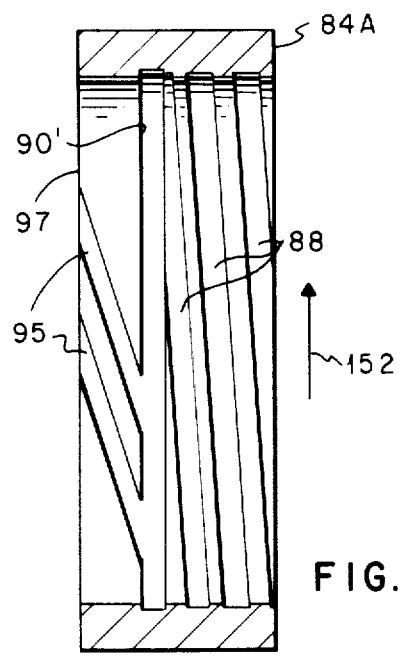
FIGS. 6 and 7 are cross-sectional views of the starboard pump ring.
Figure 7:
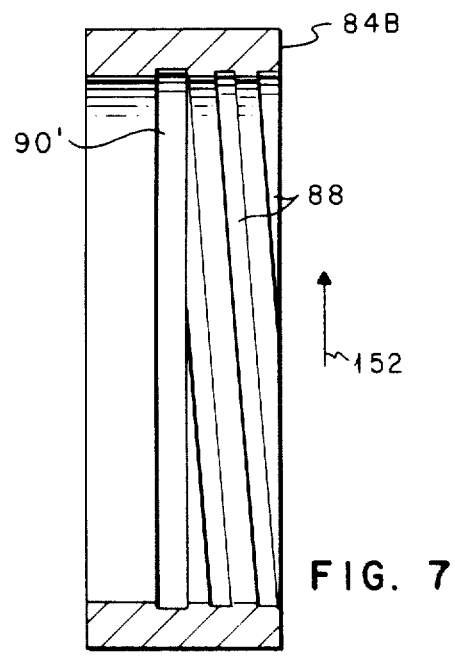

Pump ring 82 is further illustrated in cross section in FIGS. 4 and 5 which we now refer to. Port ring 82 divided for illustration purposes into semicircular rings 82A, illustrated in FIG. 4, and 82B, illustrated in FIG. 5, may be made from a steel alloy. Port pump half rings 82A and 82B, positioned inside housing 22 at the left end thereof when viewing FIG. 3, include a plurality of helical right hand grooves, hereinafter referred to as port channelling grooves 86, located on the inside surface thereof and communicating with a central collecting groove 90 positioned inboard of grooves 86 and circulating about the inside surface of ring 82 for a continuous 360°. By right hand grooves it is meant that by looking axially from the left end of the extruder in FIG. 3, a clockwise rotation around port channelling grooves 86 would cause an inward advancement into the housing 22, and a counterclockwise rotation around grooves 86 would result in an outward advancement. Port ring 82A is distinguished from 82B by helical right hand outlet grooves 94 located inboard of and communicating with central groove 90 and extending to the inner edge 96 of port ring 82A; port ring 82 being positioned inside housing 22 such that the outlet grooves 94 are in communication with feed section 32. Referring now to FIGS. 6 and 7, shown there is starboard pump ring 84, divided for illustration purposes into semicircular rings 84A, illustrated in FIG. 6, and 84B, illustrated in FIG. 7, positioned at the right end of shaft 18 inside housing 22. Starboard semicircular rings 84A and 84B include a plurality of left hand helical grooves, hereinafter referred to as starboard channelling grooves 88, on the inside surface thereof, communicating with a central collecting groove 90' positioned inboard of grooves 88 and circulating about the inside surface of ring 84 for a continuous 360°. By left hand grooves it is meant that by looking axially from the left end of the extruder in FIG. 3, a counterclockwise rotation around starboard channelling grooves 88 would cause an inward advancement into the housing 22 and a clockwise rotation around the grooves 88 would cause an outward advancement. Starboard semicircular ring 84A is distinguished from ring 84B by helical left hand outlet grooves 95 positioned inboard of and communicating with central groove 90' and extending to inner edge 97 of the starboard ring 84A; ring 84 being positioned inside housing 22 such that outlet grooves 95 are in communication with feed section 32. Helical grooves 86, 88 measure in width approximately 0.109 inch, a depth of approximately ⅛ to 3/16 inch, with a distance of approximately ¼ inch between the center line of each groove. Central grooves 90, 90' are approximately ½ inch wide with a depth of approximately ⅛ inch. Outlet grooves 94, 95 measure approximately ¼ inch in width with approximately a ¼ inch depth. Other groove sizes may be used without detracting from the present invention, however, helical grooves 86, 88 should be designed so that after one revolution about rings 82, 84, any melt remaining in grooves 86, 88 will be directed into central grooves 90, 90'.

Returning now to FIG. 3, it can be seen that formed into the surface of rotor 30 about its circumference inside starboard pump ring 84 and starboard channelling grooves 88 are a plurality of starboard directing grooves 102, angularly positioned on rotor 30 such that when rotor 30 is rotated in an upward rotational direction as viewed in FIG. 3 or a clockwise direction as viewed in FIG. 2, a vector force is imparted to the thermoplastic material both in an upward rotational direction and in an axial direction towards the center of housing 22. It should be appreciated that as rotor 30 rotates in an upward rotational direction directing grooves 102 work in rotational combination with grooves 88 to force thermoplastic material along grooves 88 by means of a wiping action both in an axial direction toward the center of housing 22 and in a clockwise rotational direction, the melt eventually reaching central groove 90' where it continues to be directed in a clockwise rotational direction. As the thermoplastic material is forced along in central groove 90 by the rotational force imparted by directing grooves 102, it is discharged through outlet groove 95 by the combined axial and rotational forces imparted by directing grooves 102 and toward the center of housing 22 and into the feed section 32.

In a similar manner, port directing grooves 100 include a plurality of grooves about the circumference of rotor 30 opposite the inside surface of port pump ring 82 and port channelling grooves 86. Grooves 86 are angularly positioned such that when rotor 30 is rotated in an upward rotational direction as viewed in FIG. 3 or a clockwise direction as viewed in FIG. 2, a vector force is imparted to the thermoplastic material both in a upward rotational direction and an axial direction toward the center of housing 22. As rotor 30 moves in the upward rotational direction, port directing grooves 100 work in rotational combination with port channelling grooves 86 to force thermoplastic material along grooves 86 in an axial direction toward the center of housing 22 and in a rotational direction into and along central groove 90. As the thermoplastic material is collected in central groove 90, it is discharged through outlet grooves 94 by the rotational force from directing grooves 100, toward the center of housing 22 and into feed section 32. Directing grooves 100, 102 may be approximately ⅛ inch wide, with approximately ¼ inch between their respective center lines. It should be appreciated that the exact thrust angle A in FIG. 3 of the directing grooves 100, 102, defined by an imaginary center line drawn parallel to the rotor axis through the grooves 100, 102, intersecting a line drawn along grooves 100, 102, is not critical. It is important, however, that grooves 100, 102 be angularly positioned such that when rotor 30 is rotated in an upward direction in FIG. 3, vector forces are imparted to the thermoplastic melt both in an upward direction and inward direction toward the center of housing 22. A thrust angle A between about 20° and about 70° would provide the necessary rotational and axial directing forces, however, a thrust angle A between about 35° and about 60° is preferred.

In addition, it is preferred that the distance between the inner surface of pump rings 116, 117 and the outer surface of rotor 30 be between 0.014 inch to 0.020 inch for extruding thermoplastic material. A lesser clearance places too much drag on the rotor 30, a greater clearance may result in some leakage from housing 22.

Figure 8:
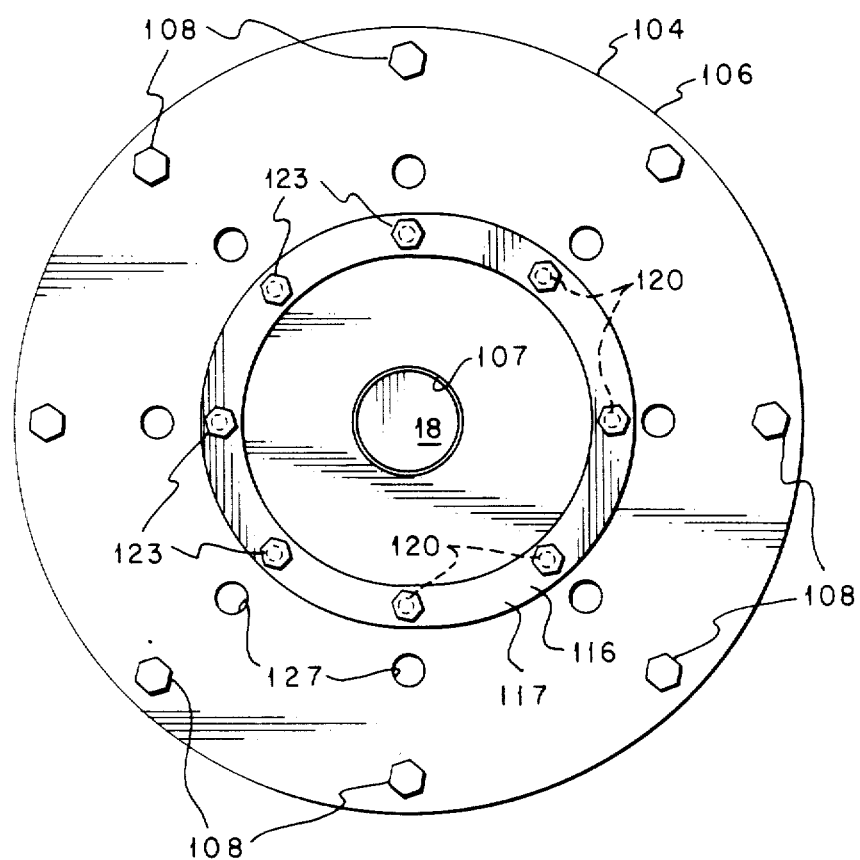
FIG. 8 is an axial view of the end plate and bearing housing.

Referring now to FIGS. 3, and 8, housing 22 is enclosed at opposite ends by port and starboard end plates 104 and 106 respectively. Thrust rings 109 are press-fit within thrust ring counterbore receptacles 111, 112 which are milled into the inside surface of end plates 104, 106 to prevent axial movement of shaft 18. End plates 104 and 106 include bores 107 for insertion of rotary shaft 18 therethrough; the end plates being secured to housing 22 by bolts 108 screwed into threaded mounting holes 110. Rotary shaft 18 is positioned within bearing channel 118 of port and starboard bearing housing 116 and 117 respectively, and supported therein for rotational movement by bearings 119 held in place by seal rings 113 on either side thereof. Seal rings 113 also serve to prevent migration of lubricant out of the bearings and prevent contamination entering the bearings from the extruder or from the atmosphere. Bearing housings 116, 117 fitted within counterbore receptacles 115 milled into the outside surface of end plates 104, 106, support rotary shaft 18 at opposite ends of housing 22. Bearing housings 116, 117 are secured to the outside of end plates 104, 106 respectively by bolts 123 inserted through bearing housing holes 122 and into end plate threaded holes 120. Bearing housings 116, 117 may enclose a roller type bearing such as Link-Belt series 22300 LB to support rotary shaft 18 at opposite ends. Included also in bearing housings 116, 117 are water cooling holes 121 for circulation of cooling water throughout bearing housings 116, 117.

In a preferred embodiment illustrated by FIGS. 3 and 8, bearing housing shaft channel 118 is located axially off center inside bearing housing 116, 117. End plates 104, 106 have a plurality of bearing housing repositioning holes 120 including bolts 123 threadably engaged therein for repositioning bearing housing 116, 117 at various locations relative to end plates 104, 106; repositioning holes 120 being concentrically oriented about shaft bore 107 and aligning with bearing housing holes 122 for engagement of bolt 123 therethrough. By closer observation, it can be appreciated that rotationally repositioning bearing housings 116, 117 relative to end plates 104, 106 by use of repositioning holes 120, the off center location of channel 118 allows the position of shaft 18 and hence the position of rotor 30 within housing 22 to be changed, thereby varying the size and shape of feed section 32 and compression section 34. It should be appreciated that the diameter of bore 107 is sufficiently large to permit lateral repositioning of shaft 18 therewithin. What has been achieved is a simple method of varying the feed section and compression section clearances of the rotary extruder to accommodate different types of thermoplastic material extruded therethrough. In fact, the position of bearing housing 116, 117 relative to repositioning holes 120 may be calculated to achieve fixed ratios and labeled as such so that the repositioning of the bearing housings is relatively simple, thereby achieving an exactly or precisely determined ratio without the need for minor adjustments and the misalignments created in other rotary extruders. In a preferred embodiment, depicted in FIG. 8, utilizing eight repositioning holes 120, a shaft channel offset of 0.50 inch (which is somewhat exaggerated in FIG. 8), a feed section clearance of 0.250 inch, and compression section clearance of 0.100 inch, the following feed section/compression section clearance ratios may be obtained simply by rotating the port and starboard bearing housings 116, 117 in unison: 2.5–1, 3–1, 3.5–1, 4–1, 4.5–1. The bearing housings 116, 117 may be repositioned simply by loosening bolts 108 of end plates 104, 106 to allow lateral movement of pump rings 82, 84 respectively, then removing bolts 123 holding bearing housings 116 and 117 to end plates 104, 106, and rotating bearing housings 116, 117 to achieve the desired feed/compression ratio. Then bolts 123 are reinserted in bearing housing holes 122 engaging repositioning holes 120, and bolts 108 are retightened in end plates 104, 106. As mentioned previously, the outside diameter of pump rings 104, 106 is approximately ½ inch less than the inside diameter of counterbore receptacles 87, 89, to allow radial realignment of the pump rings 104, 106 and provide adequate space between the inside surface of housing 22 and rotor 30 after rotor 30 has been repositioned. Included in end plates 104, 106 are a plurality of approximately ¾" spillage holes 127 concentrically located about bore hole 107 for the escape of any volatiles from housing 22. Holes 127 may also serve as emergency thermoplastic melt spillage outlets in the event the pump rings malfunction.

Returning now to FIG. 1, there is shown a feed assembly 130, including a feed chute 24 located atop extruder housing 22 which receives thermoplastic material from an overhead feed hopper 132 by gravity flow to endless belt 134 located thereunder; feed belt 134 being driven by feed motor 136 connected to feed belt 134 by means of drive shaft 138 and roller 140. Surprisingly, flood feeding of thermoplastic melt to the housing 22 and rotor 30 will prevent proper operation of the extruder. It has been found that contact of the pellets with the thermoplastic melt clinging to the surface of the rotor 30 is important for their proper heating and shearing. Flood feeding overloads the surface of the rotor with too many pellets resulting in buildup of pellets above the surface of rotor 30; on the other hand, selectively feeding the pellets to the housing 22 assures greater contact between the pellets and the melt. It should be appreciated that feed chute 24 encloses feed inlet opening 25 which exposes a majority of the length of rotor 30 to the thermoplastic feed thereby insuring distribution across its length. Feed belt 134 has a width slightly smaller than that of feed chute 24 to help distribute thermoplastic material across rotor 30. Included within feed chute 24 are a plurality of feed distribution plates 135 vertically positioned there to laterally divide chute 24. Distribution plates 135 may be bent inwardly toward the middle of chute 24 to deflect thermoplastic material from the middle of chute 24 towards the ends thereof to provide a more uniform distribution of feed across rotor 30. Overhead feed hopper 132 includes inverted cone 144 having delivery feed nozzle 146 at the apex thereof. The delivery rate of feed from hopper 132 is controlled by the speed of belt 134. The vertical position of feed nozzle 146 relative to belt 134 is adjustable to allow for variations in the size of the thermoplastic pellets, by vertical adjustment of feed hopper 132. A vertical distance between the tip of feed nozzle 146 and feed belt 132 of approximately 1½ times the pellet size ensures adequate supply of feed to belt 132 without allowing thermoplastic material to overflow from belt 132. Feed chute 24 also includes water cooling holes (not shown) for circulation of water therethrough to prevent heat buildup in the feed held there. In addition, warm air conduit 148 directs warm air at approximately 175° F. from a heater fan (not shown in drawings) into feed hopper 132 in proximity to feed nozzle 146. The warm air eliminates moisture between the thermoplastic particles which often shows up as pock marks on the extruded thermoplastic film. The temperature of the warm air is kept sufficiently low so that there is no melting of the thermoplastic feed within hopper 132. However, the increased temperature does allow a higher throughput since the plastic material is elevated closer to its melt temperature.

Operation of the apparatus proceeds as follows: referring now to FIG. 1, thermoplastic material is delivered to overhead feed hopper 132 by means of either a conveyor belt, by other mechanical means, or manually. Thermoplastic feed falls by gravity flow through feed nozzle 146 to the surface of rotating feed belt 134 and from belt 134 into feed chute 24 located directly beneath the delivery end of feed belt 134 as it rotates in a clockwise manner as depicted in FIG. 1. The delivery rate of thermoplastic feed to feed chute 24 is determined by the rotational velocity of belt 134. It should be noted that feed motor 136 and feed belt 134 are supported upon shelf 154 which has an opening cut therein to allow the thermoplastic feed to be delivered to feed chute 24.

Prior to beginning delivery of thermoplastic feed into feed chute 24, warm air is directed from a heater fan through conduit 148. Drive motor 12 is engaged to deliver rotary power to rotary extruder 14 by means of drive belt 20. When rotary extruder 14 has reached operating speed, delivery of thermoplastic material to feed chute 24 is begun.

Referring now to FIG. 2, with rotor 30 being driven in a clockwise direction, thermoplastic feed gravity falls through feed inlet opening 25 onto the surface of rotor 30. Choker Bar 62 is positioned to allow some of the thermoplastic melt sticking to rotor 30 to return to feed opening 25 thereby providing a sticky surface for the thermoplastic feed to cling to, resulting in a faster rate of throughput and some shearing action due to the loose thermoplastic material rubbing against the thermoplastic material stuck to the surface of rotor 30. Choker bar 62 is adjusted during operation of the extruder to regulate the thermoplastic melt exiting die 26. If the melt exiting die 26 contains some unmelted or partially melted pellets, then choker bar 56 is raised to decrease the quantity of material forced out slot 28, thereby maintaining greater melt and heat inside housing 22. On the other hand, if the temperature of the melt exiting die 26 is too high, choker bar 62 is lowered to force more melt to exit housing 22, thereby decreasing the total melt and heat therein. Clockwise movement of rotor 30 carries the feed into feed section 32 where heating of the feed occurs. As the pellets impact the sticky thermoplastic melt clinging to rotor 30, they are rapidly heated. Vapors from the heated melt and from the expanded air around the heated pellets is expelled out inlet 25 and feed chute 24. As rotor 30 continues to rotate, the partially heated thermoplastic feed is carried therewith through transition zone 36 into the narrower compression section 34 wherein the majority of the heating and melting of the feed takes place due to its compression in the reduced clearance between the rotor 30 and housing 22 and the resulting increased pressure therein. It should be appreciated that there are no clearly defined limits between feed section 32 and compression section 34; therefore, some of the heating action previously described will occur in the transitional section 36 located therebetween. Further clockwise rotation of rotor 30 carries the thermoplastic material to discharge opening 52 where the material is forced to exit through die 56. Any feed attempting to continue past the discharge opening 52 is blocked by choker bar 62 positioned above the surface of rotor 30. Choker bar 62 is adjustable such that a certain small portion of feed may be rotated underneath the choker bar to provide a continuous thin layer of melt on the rotor as previously described. As thermoplastic melt is forced through discharge opening 52 into die slot 28, the feed is extruded into the final shape determined by die slot 28.

As mentioned previously, a significant problem with other extruders resulted when thermoplastic melt was forced out the opposite ends of housing 22 through shaft bore 107. In the present invention, end plates 104, 106 and port and starboard pump rings 82, 84 provide a barrier to the axial outward flow of thermoplastic melt. As illustrated in FIGS. 3 through 7, pump rings 82 and 84 are unique in that they redirect and rechannel thermoplastic melt away from the end plates and back into the feed section 32. This recycling of the excess thermoplastic melt is accomplished by the channelling grooves 86, 88 located on the inside surfaces of the pump rings 82, 84, with arrows 152 indicating the direction of melt travel around pump rings 82, 84. As previously described, port pump ring 82 contains right hand helical grooves 86 which have a component in the direction of rotation of rotary shaft 18 and an axial component away from end plate 104 towards the center of housing 22. Conversely, starboard pump ring 84 contains left handed helical grooves 88 which also direct the thermoplastic melt away from end plate 106 in a direction towards the center of housing 22. As the melt is directed inwardly, it is collected in a larger central collecting channels 90, 90' in communication with outlet grooves 94, 95 exiting into the feed section 32.

Working in conjunction with the grooves and pump rings 82 and 84 are directing grooves 100 and 102 positioned on the port and starboard ends of the rotor 30, rotating with rotor 30 to provide a pushing force for the thermoplastic melt along grooves 86, 88, into and along central grooves 90, 90' and outlet grooves 94, 95, and into feed section 32. The combined thrust and axial forces of the pump rings and the directing grooves provide the necessary force to propel the thermoplastic melt away from the end plates and into the feed section 32.

Figure 9:
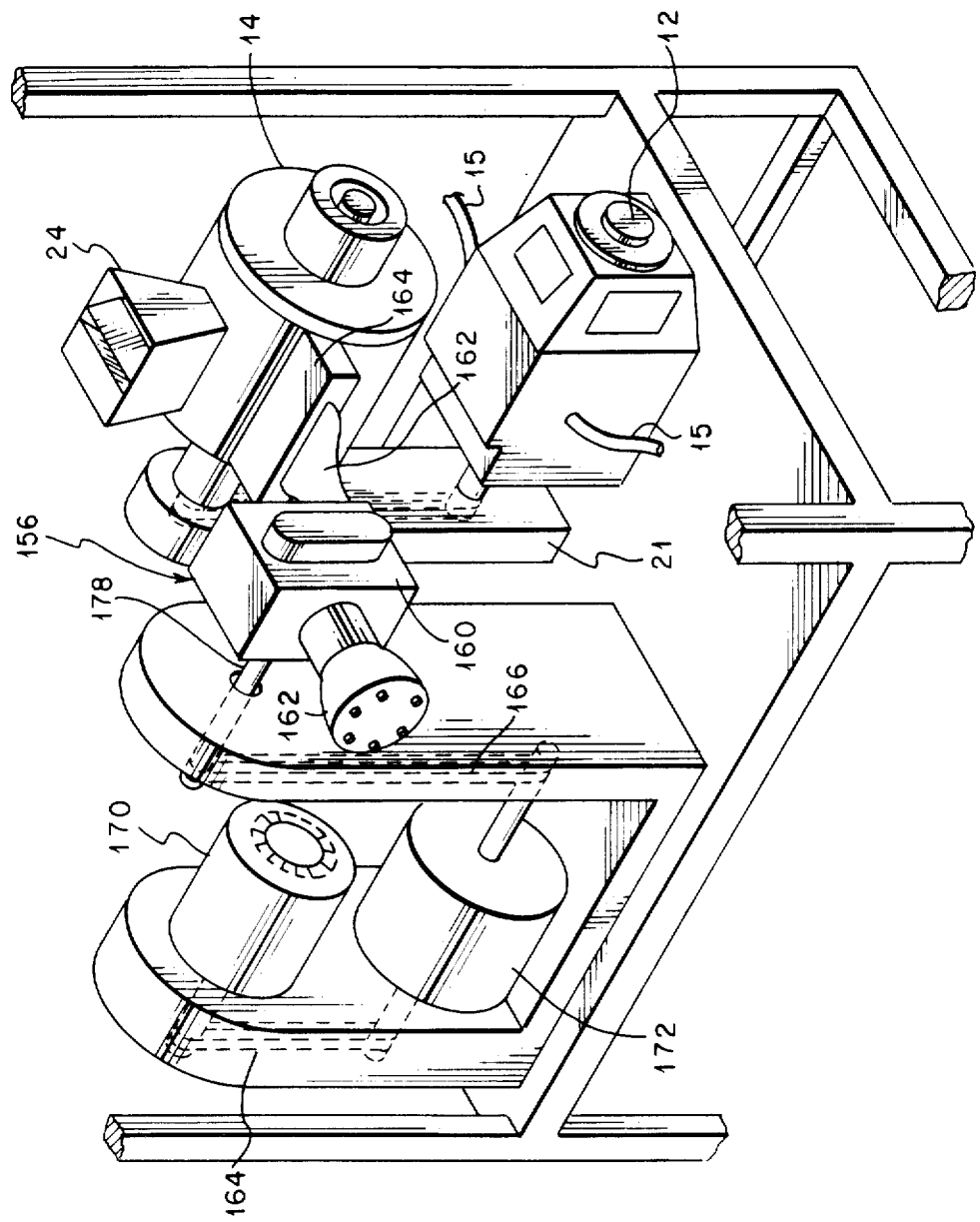
FIG. 9 is a perspective view of the apparatus directly connected to a pressure augmenting system.

In another embodiment of the invention depicted in FIG. 9, a pressure discharge augmenting system 156, is positioned in communication with rotary extruder 14 at the discharge end thereof. The discharge pressure from rotary extruder 14 will generally be between 225 psi to 250 psi which is sufficient for the extrusion of the thermoplastic materials mentioned previously. However in some instances, a higher discharge pressure has been found to be necessary to extrude through certain high pressure dies, such as a strand die, which requires an extruder discharge pressure of up to 2,000 psi. To achieve this higher discharge pressure there is provided a pressure augmenting system 156 including a rotary gear pump 160 in direct communication through conduit 162 with heater 164 positioned at the discharge end of rotary extruder 14. Heater 164 is an electrical resistance type heater to provide the necessary heat to ensure the thermoplastic material remains in the melt state through pump 160. Rotary gear pump 160 which has a discharge pressure of about 2,000 psi discharges through a die 162. Rotory gear pump 160 is driven by an electrical DC drive motor 170 having an output of approximately 15 hp acting through a variable speed belt 164 to a reduction gear 172 which in turn drives chain 166 to obtain the desired extrusion pressure through die 162. Surprisingly, an additional advantage of pump augmenting system 156 is a reduction in back pressure from the die 26 into the housing 22 due to some "sucking action" by pump 160. The decreased back pressure results in decreased housing 22 internal pressures which in turn reduce the tendency for melt to travel along the rotor shaft to housing end plates. The combination of the pump rings 82, 84 and pump augmenting system 156 effectively eliminates any leakage of thermoplastic melt around end plates 104, 106.

Various other modifications and refinements may be made in the apparatus described herein without departing from the concept of the present invention. It should be noted that the concepts of the present invention are not limited to the processing of thermoplastic material. Any type of rotary device having a leakage problem may utilize the re-channelling concept illustrated by the grooved pump rings and rotor of the present invention. As the viscosity of the material within the device decreases, the rotational speed of the rotor would need to increase; however, for more viscous materials, the rotational speed would be decreased. When extruding viscous thermoplastic material this re-channeling concept has been found to work at rotational speeds as low as 100 rpm; therefore pumps transporting viscous materials such as oil which experience leakage from the ends of the housing would benefit from the concepts of the present invention. Therefore, the apparatus described herein and depicted in the accompanying drawings is exemplary only and not intended as limitative of the scope of the invention.

What is claimed is:

1. Apparatus for plasticizing thermoplastic material and the like, comprising:
    a housing having an inner recess, an inlet, and a die aperture communicating with said recess;
    an extrusion member rotatably mounted in said recess in said housing, said extrusion member comprising a cylindrical rotor eccentrically disposed within said recess to define a first clearance zone and an opposing second smaller clearance zone, both said clearance zones extending along the axial length of said rotor between the inner surface of said housing and the outer surface of said rotor, said rotor including a plurality of directing grooves on the inside surface at each end thereof, said directing grooves angularly positioned with respect to the direction of said rotation of said rotor to propel thermoplastic material therein circumferentially about the inner surface of said housing and axially toward the center of said housing;
    ring members positioned within said recess at opposite ends thereof, each said ring member including a plurality of helical channelling grooves on the inside surface thereof, said channelling grooves encircling said extrusion member and directed axially toward the center of said housing to spirally channel thermoplastic material propelled by said directing grooves towards the center of said housing, a central collecting groove encircling the inside surface of said ring in communication with channeling grooves to collect thermoplastic material spirally propelled from said channelling grooves, and at least one outlet groove on the inside surface of said ring members in communication with said central collecting groove and with said first clearance zone to channel thermoplastic material spirally propelled from said central collecting groove into said first clearance zone; and,
    means for axially rotating said rotor to plasticize the thermoplastic material within said clearance zones and to deliver the plasticized material from said clear zones through said die aperture.

2. The apparatus as recitd in claim 1 wherein said recess is elliptically shaped.

3. The apparatus as recited in claim 1 wherein said ring members comprise a first ring member having a plurality of right hand helical channelling grooves and a second ring member having a plurality of left hand helical channelling grooves, said first and second ring members positioned within said recess at opposite ends thereof.

4. The apparatus as recited in claim 3 wherein said directing grooves are positioned on said roller at a thrust angle between about 20° and about 70°.

5. Apparatus for plasticizing thermoplastic material and the like, comprising:
    (a) a housing having an inner, elliptically shaped recess, an inlet, and a die aperture communicating with said recess;
    (b) an extrusion member rotatably mounted in said recess in said housing, said extrusion member comprising a cylindrical rotor eccentrically disposed within said recess to define a first clearance zone and an opposing second smaller clearance zone, both clearance zones extending along the axial length of said rotor between the inner surface of said housing and the outer surface of said rotor;
    (c) said housing also including a plurality of connecting means at opposite ends thereof, said connecting means concentrically located about the central axis of said housing;
    (d) support means for supporting said rotor within said recess, said support means adapted to be repositioned within said recess to change the rotational axis of said rotor relative to the inner surface of said recess, said support means including a support member rotatably mounted at each end of said rotor and removably attached to said housing by said connecting means, said rotor being offset from the axial center of said support means such that repositioning of support means relative to the housing by rotation thereof causes the axial position of the rotor to change with respect to the inner surface of the housing; and
    (e) means for axially rotating said rotor to plasticize thermoplastic material within said clearance zones and to deliver plasticized material from said clearance zones through said die aperture.

6. The apparatus as recited in claim 5 wherein said connecting means includes at least one bolt inserted through said support member to threadably engage a hole in said housing.

7. Apparatus for plasticizing thermoplastic material and the like, comprising:
    a housing having an inner recess, an inlet, and a die aperture communicating with said recess;
    an extrusion member rotatably mounted in said recess in said housing, said extrusion member comprising a cylindrical rotor eccentrically disposed within said recess to define a first clearance zone and an opposing second smaller clearance zone, both clearance zones extending along the axial length of said rotor between the inner surface of said housing and the outer surface of said rotor, said rotor including a first plurality of directing grooves on the inside surface at each end thereof, said directing grooves angularly positioned with respect to the thermoplastic material therein circumferentially about the inner surface of said housing and axially toward the center of said housing;
    a ring member positioned within the recess at opposite ends thereof, each said ring member including a plurality of helical channelling grooves on the inside surface thereof opposite said directing grooves, said channelling grooves enclircling said extrusion member and directed axially toward the center of said housing to spirally channel thermoplastic material propelled by said directing grooves toward the center of said housing, a central collecting groove encircling the inside surface of said ring in communication with said channelling grooves to collect thermoplastic material spirally propelled from said channelling grooves, and at least one outlet groove on the inside surface of said rings communicating with said central collecting groove and said first clearance zone to channel thermoplastic material spirally propelled from said central collecting groove into said first clearance zone;

support means for supporting said rotor within said recess, said support means adapted to be repositioned within said recess to change the rotational axis of said rotor relative to the inner surface of said recess; and, means for axially rotating said rotor to plasticize thermoplastic material within said clearance zones and to deliver plasticized material from said clearance zones through said die aperture.

8. The apparatus as recited in claim 7 wherein said recess is elliptically shaped.

9. The apparatus as recited in claim 8 wherein said ring members comprise a first ring member having a plurality of right hand helical channelling grooves and a second ring member having a plurality of left hand helical channelling grooves, said first and second ring members positioned within said recess at opposite ends thereof.

10. The apparatus as recited in claim 9 wherein directing grooves are positioned on said rotor at a thrust angle between about 20° and about 70°.

11. The apparatus as recited in claim 10 wherein
 (a) said housing includes a plurality of connecting means at opposite ends thereof, said connecting means concentrically located about the central axis of said housing; and
 (b) said supporting means includes a support member rotatably mounted at each end of said rotor and removably attached to said housing by said connecting means, said rotor being offset from the axial center of said support means such that repositioning of the support means relative to the housing by rotation thereof causes the rotational axis of the rotor to change with respect to the inner surface of the housing.

12. The apparatus as recited in claim 11 wherein said connecting means includes at least one bolt inserted through said support member to threadably engage a hole in said housing.

* * * * *